US010762691B2

(12) United States Patent
Yeung et al.

(10) Patent No.: US 10,762,691 B2
(45) Date of Patent: Sep. 1, 2020

(54) TECHNIQUES FOR COMPENSATING VARIABLE DISPLAY DEVICE LATENCY IN IMAGE DISPLAY

(71) Applicant: Microsoft Technology Licensing, LLC, Redmond, WA (US)

(72) Inventors: Andrew Zicheng Yeung, Redmond, WA (US); Brent Michael Wilson, Kirkland, WA (US); Jack Andrew Elliott, Seattle, WA (US); Matthew David Sandy, Sammamish, WA (US); Michael George Boulton, Seattle, WA (US); Yang You, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/896,712

(22) Filed: Feb. 14, 2018

(65) Prior Publication Data
US 2019/0080505 A1 Mar. 14, 2019

Related U.S. Application Data

(60) Provisional application No. 62/556,118, filed on Sep. 8, 2017.

(51) Int. Cl.
*G06T 15/20* (2011.01)
*G06T 15/00* (2011.01)
(Continued)

(52) U.S. Cl.
CPC .......... *G06T 15/205* (2013.01); *G02B 27/017* (2013.01); *G02B 27/0179* (2013.01);
(Continued)

(58) Field of Classification Search
CPC ........................... G06T 15/205; G02B 27/017
See application file for complete search history.

(56) References Cited

U.S. PATENT DOCUMENTS 9,357,228 B2  5/2016 Au et al.
9,819,965 B2  11/2017 Puri et al.
(Continued)

FOREIGN PATENT DOCUMENTS

EP  2066124 A1  6/2009
WO  2015167908 A1  11/2015

OTHER PUBLICATIONS

"International Search Report And Written Opinion Issued In PCT Application No. PCT/US2018/038880", dated Sep. 3, 2018, 23 Pages.

(Continued)

*Primary Examiner* — Terrell M Robinson
(74) *Attorney, Agent, or Firm* — Arent Fox LLP (57) ABSTRACT

Examples described herein generally relate to displaying an image on a display device where a motion during a latency between a first time associated with activating a first portion of the display device and a second time associated with activating a second portion of the display device is predicted. At least a second portion of an image, to be displayed at the second time, is distorted based at least in part on a function of the motion and the latency to compensate for the latency. A first portion of the image is displayed at the first time by activating the first portion of the display device. The second portion of the image, as distorted, is displayed at the second time by activating the second portion of the display device.

17 Claims, 5 Drawing Sheets

(51) Int. Cl.
  *G09G 5/34* (2006.01)
  *G06F 3/147* (2006.01)
  *G02B 27/01* (2006.01)
  *G06F 3/01* (2006.01)
  *G09G 3/00* (2006.01)

(52) U.S. Cl.
  CPC .............. *G06F 3/012* (2013.01); *G06F 3/147* (2013.01); *G06T 15/00* (2013.01); *G09G 5/346* (2013.01); *G06T 2215/16* (2013.01); *G09G 3/003* (2013.01); *G09G 2320/0261* (2013.01); *G09G 2320/106* (2013.01); *G09G 2360/08* (2013.01)

(56) References Cited

U.S. PATENT DOCUMENTS

| | | | | |
|---|---|---|---|---|
| 10,152,775 | B1* | 12/2018 | Bellows | G02B 27/0172 |
| 2010/0091096 | A1* | 4/2010 | Oikawa | G06F 3/011 |
| | | | | 348/53 |
| 2014/0354515 | A1* | 12/2014 | LaValle | G02B 27/017 |
| | | | | 345/8 |
| 2015/0153898 | A1* | 6/2015 | Bathiche | G06F 3/0418 |
| | | | | 345/173 |
| 2015/0234455 | A1* | 8/2015 | LaValle | G02B 27/017 |
| | | | | 345/8 |
| 2016/0035139 | A1* | 2/2016 | Fuchs | G02B 27/017 |
| | | | | 345/633 |
| 2016/0252955 | A1* | 9/2016 | Yamamoto | H04N 5/74 |
| | | | | 345/441 |
| 2016/0269732 | A1 | 9/2016 | Li et al. | |
| 2017/0148206 | A1 | 5/2017 | Donner et al. | |
| 2017/0243319 | A1 | 8/2017 | Wittenbrink et al. | |
| 2017/0345398 | A1* | 11/2017 | Fuchs | G02B 27/017 |
| 2018/0047332 | A1 | 2/2018 | Kuwahara et al. | |
| 2018/0081429 | A1* | 3/2018 | Akenine-Moller | G06F 3/011 |
| 2018/0182273 | A1* | 6/2018 | Hwang | G06F 3/011 |
| 2018/0211638 | A1* | 7/2018 | Ozguner | G09G 5/395 |

OTHER PUBLICATIONS

Van Waveren, J.M.P., "The Asynchronous Time Warp For Virtual Reality On Consumer Hardware", In Proceedings of the 22nd ACM Conference on Virtual Reality Software and Technology, Nov. 2, 2016, pp. 37-46.

Jerald, Jason, "Latency Compensation for Head-Mounted Virtual Reality", In UNC Computer Science Technical Report, May 14, 2004, 17 Pages.

Friston, et al., "Construction and Evaluation of an Ultra Low Latency Frameless Renderer for VR", In Journal of IEEE Transactions on Visualization and Computer Graphics, vol. 22, Issue 4, Apr. 21, 2016, 10 Pages.

* cited by examiner

TECHNIQUES FOR COMPENSATING VARIABLE DISPLAY DEVICE LATENCY IN IMAGE DISPLAY

CLAIM OF PRIORITY UNDER 35 U.S.C. § 119

The present application for patent claims priority to Provisional Application No. 62/556,118, entitled "TECHNIQUES FOR COMPENSATING VARIABLE DISPLAY DEVICE LATENCY IN IMAGE DISPLAY" filed Sep. 8, 2017, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. One area of computing devices that has grown in recent years are virtual reality (VR) devices, which rely on a graphics processing unit (GPU) to render graphics from a computing device to a display device based on rendering instructions received from the computing device. In VR devices, the display may have a scan-out property in which certain portions of the display are activated to display a portion of an image before other portions of the display. One type of such a display is a rolling scan-out display device where portions on the display panel are activated to emit light or generate photons from left to right and then top to bottom such that there is a delay between display of certain portions of an image, with the largest delay from a top left portion being with a bottom right portion. Non-uniform latency across display panels, combined with how humans interpret visual stimuli, create the potential for distorted perceptions or discomforting experiences for users For example, due to the encompassing nature of VR devices where a user's vision and experience is controlled by the VR device without orientation from the outside world, however, motion by the user (e.g., head movement) can cause a perception of the image output by the scan-out display device to be distorted due to the associated display latency during the motion. For example, if a first portion of the image is shown at a first time and a second portion of the image shown at a second time, where there is motion in between these two times, the second portion of the image may appear distorted from the first portion on a scan-out display in the VR device.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for displaying an image on a display device is provided. The method includes predicting a motion during a latency between a first time associated with activating a first portion of the display device and a second time associated with activating a second portion of the display device, distorting at least a second portion of the image, to be displayed at the second time, based at least in part on a function of the motion and the latency to compensate for the latency, displaying a first portion of the image at the first time by activating the first portion of the display device, and displaying the second portion of the image, as distorted, at the second time by activating the second portion of the display device.

In another example, a computing device for displaying an image on a display device is provided. The computing device includes a memory storing one or more parameters or instructions for executing an operating system and one or more applications, a display interface coupled with the display device for communicating signals to display images on the display device, and at least one processor coupled to the memory and the display interface. The at least one processor is configured to predict a motion during a latency between a first time associated with activating a first portion of the display device and a second time associated with activating a second portion of the display device, distort at least a second portion of the image, to be displayed at the second time, based at least in part on a function of the motion and the latency to compensate for the latency, display a first portion of the image at the first time by activating the first portion of the display device, and display the second portion of the image, as distorted, at the second time by activating the second portion of the display device.

In another example, a computer-readable medium, including code executable by one or more processors for displaying an image on a display device is provided. The code includes code for predicting a motion during a latency between a first time associated with activating a first portion of the display device and a second time associated with activating a second portion of the display device, distorting at least a second portion of the image, to be displayed at the second time, based at least in part on a function of the motion and the latency to compensate for the latency, displaying a first portion of the image at the first time by activating the first portion of the display device, and displaying the second portion of the image, as distorted, at the second time by activating the second portion of the display device.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to compensating for display latencies in displaying images on scan-out display devices. Virtual reality (VR) devices and/or other devices can include scan-out display devices where a portion of an image to be displayed is presented on the display panel (e.g., photons in a corresponding portion of the display panel are generated) at different times than other portions of the image are displayed. In latency-sensitive scenarios, for example, forward-prediction and late-stage reprojection of the display position can be used to reduce perceived latency of the system. One component of this forward-prediction is knowledge of the display panel's latency from signal input to photon output. With current display panels, a single time value for this latency is not always sufficient to capture the true nature of the display's latency. For example, in the case of scan-out displays, the latency at the top of the panel may be 5 ms, while the latency value at the bottom of the panel may be 8 ms, with a continuous gradient in between. Some examples of this kind of display may include a cathode ray tube (CRT) type of display, a liquid crystal display (LCD) panel, etc. More generally, a display can have an arbitrary non-negative latency that may be associated with each pixel, a collection of groups of pixels, a region of the display that comprises a number of pixels, etc. in the display. In any case, however, these latencies may be known or otherwise determinable, and may be used to distort images such to account for the latencies and predicted motion over a time period corresponding to the latencies.

Thus, for example, variable-latency awareness can be combined with one or both of forward-prediction and late-stage reprojection techniques. In the forward-prediction stage, the panel latency information, along with a model and information about the current and historical position of the panel, can be combined to provide one or more matrices representing 3D transformations of the display device in space, which can be provided to the rendering system for distorting the image. In one example of a single transformation matrix, the matrix can be chosen such that it reflects the latency from a chosen portion of the display (e.g. the center). Alternatively, multiple transformation matrices can be provided to account for latencies across the display at arbitrary granularity, which may indicate one matrix per pixel, for example. In either case, the system can then render an image that is distorted, but when displayed through to the display panel's latency characteristic and according to predicted motion, can be perceived as substantially undistorted where the predicted motion occurs.

In addition to forward-prediction, the panel's latency characteristics can also be applied to late-stage reprojection. In this stage, occurring just prior to emission of the image signal to the display panel, the rendered image can be reprojected to account for inaccuracies in the forward-prediction system. As with the forward-prediction system, information about how latency varies across the panel can be used to apply arbitrary transforms across the rendered image in order to distort the image prior to presentation.

Thus, in an example, where motion occurs that affects scene orientation of the image (whether due to the display device, the user, the image on the display device, etc., before display of the image, while the image is being displayed, etc.) this may result in a perceived image distortion using conventional displays. In particular, due to the motion, it may be expected that one portion of an image be displayed somewhere else. This expected distortion, though it is perceived by the user in a VR environment, can be quantified and counteracted, as described, in display devices configured as described herein. For example, the distortion can be determined based at least in part on motion information combined with properties of the scan-out display device, such as scan-out time or latency, scan-out size (e.g., scan-out width of a rolling scan-out window), scan-out order of various scan-out portions, etc., or more generally an indication of scan-out portions and associated latencies, as described above and further herein. In this regard, an opposing distortion can be applied to the image for display on the scan-out display (e.g., according to a specified scan-out portion order and latency) to counteract otherwise perceived distortion, where the opposing distortion may be in the form of one or more transformation matrices that are applied to the image.

Figure 1:
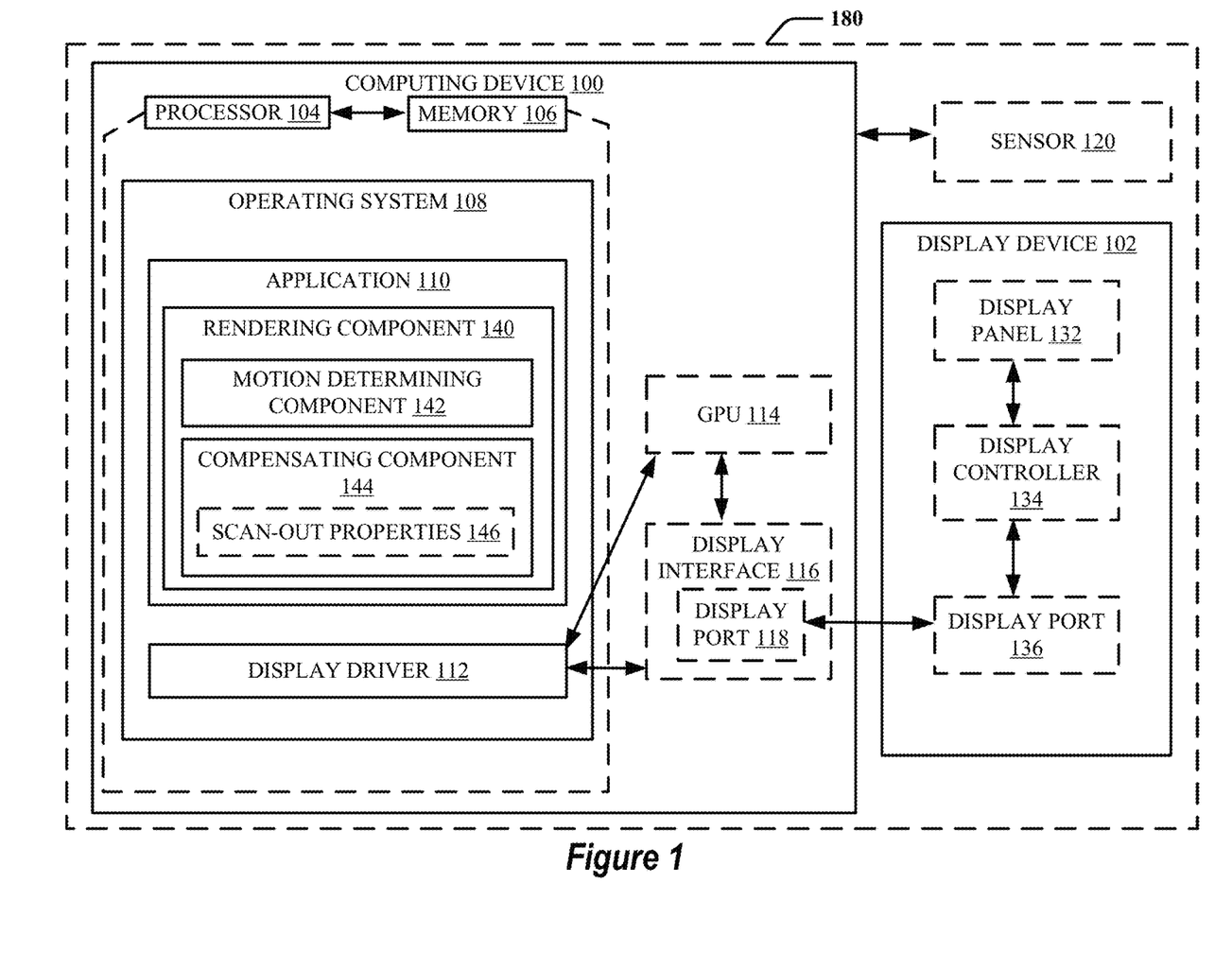
FIG. 1 is a schematic diagram of an example of a computing device and display device communicatively coupled for displaying images in accordance with examples described herein.
Figure 2:
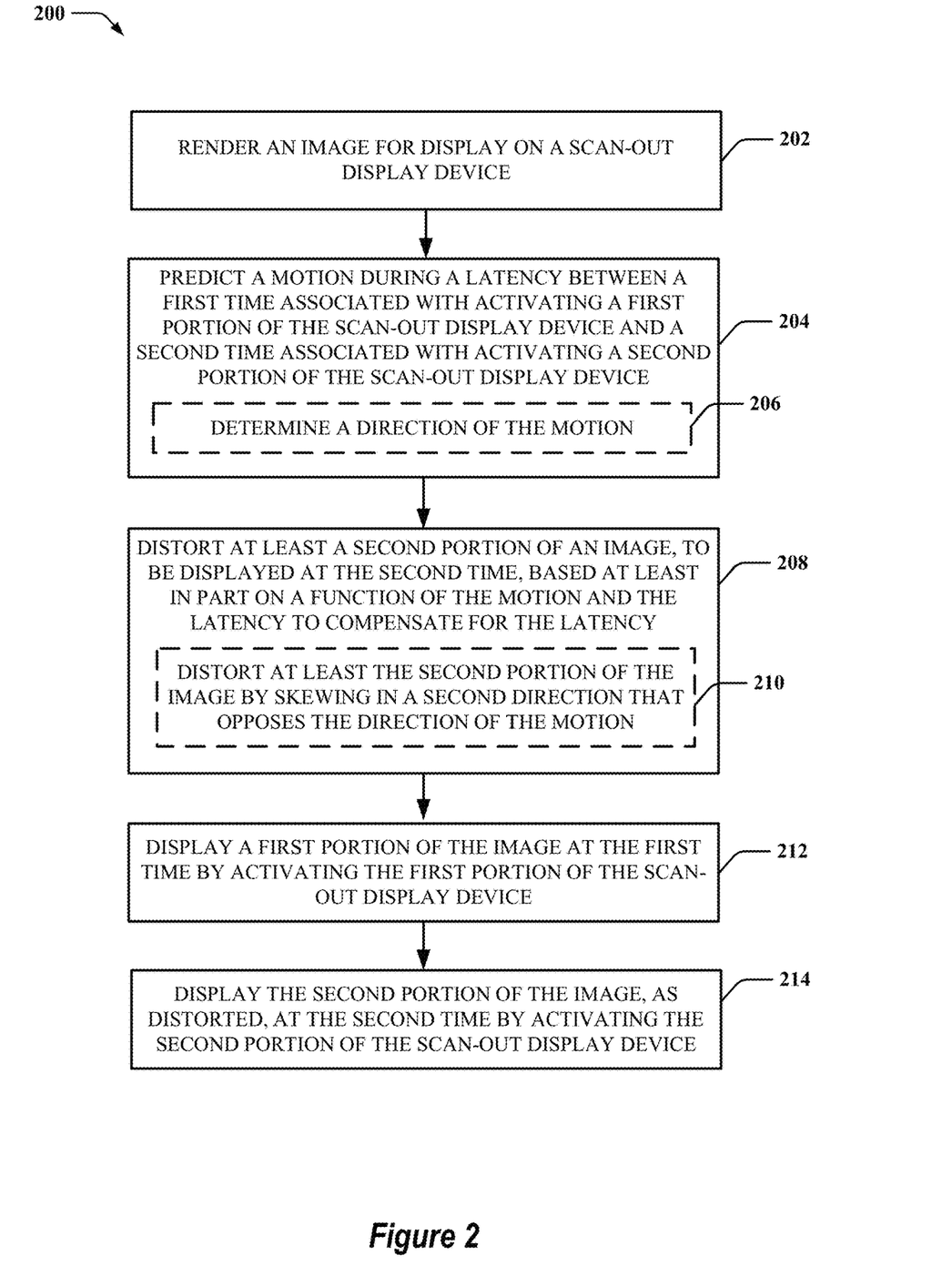
FIG. 2 is a flow diagram of an example of a method for displaying an image in accordance with examples described herein.

Turning now to FIGS. 1-4, examples are depicted with reference to one or more components and one or more methods that may perform the actions or operations described herein, where components and/or actions/operations in dashed line may be optional. Although the operations described below in FIG. 2 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100, display device 102, and/or related components, which can communicate image data for displaying images on the display device 102. For example, the display device 102 may be an internal display that is within the same housing 180 as computing device 100, a display device that is external to computing device 100, and/or the like. In addition, for example, display device 102 may be coupled to computing device 100 via a display port, a wired or wireless network connection, etc. Display device 102 can be capable of displaying a two-dimensional display, such as a desktop, a three-dimensional world, etc.

For example, computing device 100 can include or can otherwise be coupled with a processor 104 and/or memory 106, where the processor 104 and/or memory 106 can be configured to execute or store instructions or other parameters related to communicating image data to the display device 102 for displaying, as described herein. Computing device 100 can execute an operating system 108 (e.g., via processor 104 and/or memory 106) for providing an environment for executing one or more applications 110, such as one or more applications 110 that produce or otherwise obtain images for display by the display device 102. For example, the computing device 100 can include a VR device, and additionally, the one or more applications 110 can be one or more VR applications operable to cause the generation of VR images on the display device 102 of the VR device. The operating system 108 can also include a display driver 112 for communicating with a GPU 114 and/or with a display interface 116 of the computing device 100 (e.g., directly or via GPU 114) to cause rendering of one or more images for display on the display device 102.

In an example, display interface 116 can be communicatively coupled with the processor 104 and/or memory 106 for communicating with the display device 102 via a display port 118. Display port 118, as referred to herein, can include one or more of various types of ports, including a high definition multimedia interface (HDMI) port, a display serial interface (DSI) port, a mobile industry processor interface (MIPI) DSI port, a universal serial bus (USB) port, a Firewire port, or other embedded or external wired or wireless display ports that can allow communications between computing device 100 and display device 102.

For example, display device 102 can include a display panel 132 for displaying one or more images based on signals received from a display controller 134. For example, the display panel 132 can include a CRT, LCD (which can include a light emitting diode (LED) backlit LCD display), organic LED (OLED) display, digital light processing (DLP) display, etc. Display device 102 can include, but is not limited to, a head-mounted display having a single display panel or multiple display panels (e.g., one for each of two eyes) to view on the head-mounted display, a monitor, a television, a projector, or substantially any type of embedded, external, wireless, etc., display configured for communicating with computing device 100 via an embedded, external, or wireless display port 136. As mentioned, display controller 134 provides signals to the display panel 132 to cause display of images. In an example, display controller 134 can include a printed circuit board (PCB), programmable logic controller (PLC), etc., coupled with the display panel 132 to control the display panel 132 to display images based on commands received via display port 136. Thus, for example, display controller 134 can be or can include a processor configured for sending the signals to the display panel 132 based on image data (e.g., rendered image frames) received via display port 136.

In an example, computing device 100 can generate image data for providing to the display device 102 for displaying one or more images on display panel 132. Computing device 100 can accordingly communicate the image data to the display device 102 via display interface 116 using display port 118 to communicate signals corresponding to the image data to display port 136 for providing to display controller 134. In an example, operating system 108 and/or application 110 can obtain or otherwise generate images for displaying on display device 102, and display driver 112 can provide rendering instructions for rendering the images to GPU 114 (e.g., via display interface 116 or otherwise). In one example, GPU 114 can be part of the display interface 116 (e.g., a processor on a circuit board of the display interface 116). In another example, GPU 114, display interface 116, etc., can be integrated with processor 104. Substantially any combination of hardware can be possible such that GPU 114, display interface 116, etc., can communicate with processor 104 via a bus to facilitate providing the rendering instructions from the display driver 112 executing on the processor 104 (e.g., via the operating system 108) to the GPU 114. GPU 114 can process the rendering instructions to render an image, and can initiate display of at least a portion of the image on the display device 102 by transmitting associated signals to the display device 102 via display port 118 of display interface 116. The display device 102 can receive the signals generated by the GPU 114, and display controller 134 can accordingly cause display panel 132 to draw or display the image based on the signals.

Computing device 100 may also optionally include one or more sensors 120 for detecting one or more parameters related to a desired scene orientation for rendering images to the GPU 114. For example, the one or more sensors 120 can include a camera, accelerometer, gyroscope, etc. to detect a position of the computing device 100, a focus of a user operating the computing device 100, etc. In an example, a camera used in this regard may compare features of captured images at various times to determine a position, orientation, movement, etc. associated with the computing device 100. In a specific example, where computing device 100 includes a head-mounted VR display, the one or more sensors 120 can detect a head position of the user wearing the VR display such to determine the scene orientation in the virtual world corresponding to the head position in the real world. In an example, the head-mounted VR display can include a camera or other sensors that help determine its orientation from which a model of historical motion can be created; in this example, predicted motion can be produced and used as an input to the compensating component 144, as described further herein.

In an example, display device 102 may be a scan-out display device where the display device 102 activates some portions (e.g., some portions or pixels that emit light or generate photons) of the display panel 132 before other portions of the display panel 132. In one example, display device 102 may be a rolling scan-out display where the display panel 132 is activated from left to right first for a certain scan-out width (e.g., where the scan-out width can include a number or group of pixels), and then top to bottom. In this example, the display panel 132 may display a first portion of an image in a first scan-out portion of the display panel 132 at a time before another portion of the image is displayed in another scan-out portion of the display panel 132. As described, where motion occurs, by the display device 102, by a user operating the display device 102 and/or computing device 100, by the image being displayed, etc., this may cause a perceptible distortion in the image due to the properties of scan-out display devices displaying portions of the image at different latencies. The perceptible distortion can accordingly be quantified and counteracted, as described herein.

The application 110 can function to display images on the display device 102 in a virtual reality or other first-person environment, for example. In this regard, the application 110 (and/or operating system 108) can include a rendering component 140 for rendering images for display on display device 102. In this example, the images to display can be generated by the application 110 and/or operating system 108 for display on the display device 102, and may be overrendered, in some cases, to account for predicted motion between a time of rendering and displaying the image. Rendering component 140 can include a motion determining component 142 for determining or predicting motion associated with at least one of the display device 102, a user using the display device 102 and/or computing device 100, an image being displayed, etc. Rendering component 140 can also include a compensating component 144 for compensating latencies in displaying the image by distorting the image (e.g., before display, at one or more instances of time during displaying of the image, etc.) as a function of the motion and one or more scan-out properties 146.

For example, the one or more scan-out properties 146 can correspond to a latency between displaying scan-out portions of the display device 102, locations of the different scan-out portions on the display device 102, an order for displaying at the scan-out portions, a size of the scan-out portions (e.g., in pixels), a latency for the locations, etc., such to allow determining when portions of the image are to be displayed, how the scan-out portions of the display device correspond to portions of the image, etc. Based on this information, compensating component 144 can distort the portions of the image according to motion predicted for the different latencies to correct the perceived distortion due to the motion when viewing the image on the display device 102.

FIG. 2 is a flowchart of an example of a method 200 for compensating for latency in scan-out displays when displaying images. For example, method 200 can be performed by a computing device 100 and/or display device 102 communicatively coupled with one another, and is accordingly described with reference to FIG. 1, for example.

In method 200, at action 202, an image can be rendered for display on a scan-out display device. In an example, rendering component 140, e.g., in conjunction with processor 104, memory 106, etc., can render the image for display on the scan-out display device (e.g., display device 102). For example, rendering component 140 can receive or generate an image for display from an application 110 and/or based on one or more parameters for determining an orientation for the image. In one example, as described, rendering component 140 can obtain the image based at least in part on a current or predicted scene orientation in the application 110, which can be based at least in part on input corresponding to a user. For example, where the computing device 100 and/or display device 102 are part of a VR device, the head position of the user (e.g., which can be measured and provided as the position of the VR device) can provide input for determining which portion of a scene to include in the image for rendering. In addition, in an example, rendering component 140 can overrender the image to allow for reprojection of the image based on changes in head position between the time of rendering the image and actual display of the image on display device 102. Thus, where the head position changes during this time, a different portion of the overrendered image may be sent to the display device 102 for display to account for the change in head position. In addition, for example, rendering component 140 may overrender the image in an attempt to ensure that pixels exist in visible regions of the image even if some pixels were distorted out of the viewable area in the distorting action described below.

In any case, for example, the portion of the image to be displayed at a given time can be determined and obtained from the rendering component 140. Where the display device 102 is a rolling scan-out display, displaying the image can include sequentially activating a portion of the display panel 132 that is toward the top left before activating another portion of the display panel 132 that is toward the bottom right. In an example, for a scan-out width of the display panel 132, which may include a portion of pixels or other portions from top to bottom, the display device 102 can activate the pixels from left to right before moving to the next portion of pixels of the scan-out width from top to bottom. Other rolling scan-out displays, however, may roll in other directions (e.g., right to left and/or bottom to top). Examples of scan-out displays and associated portions are shown in FIG. 3.

Figure 3:
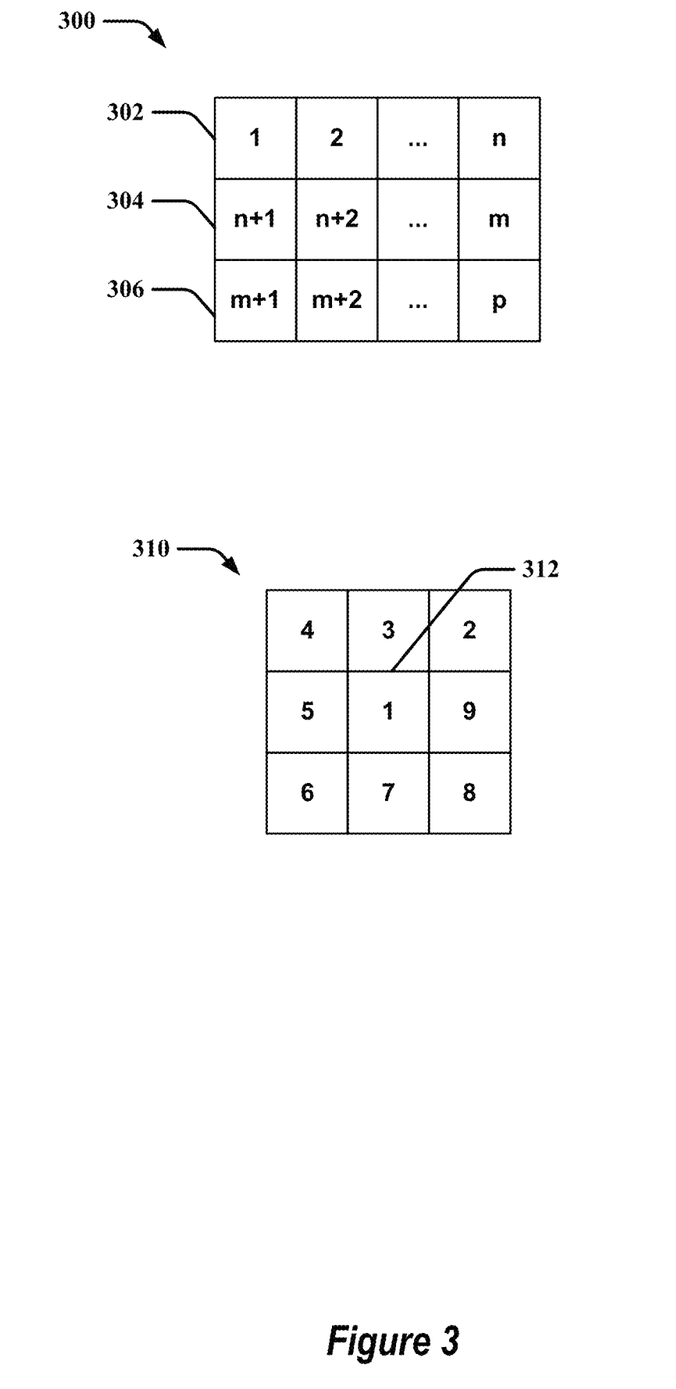
FIG. 3 illustrates schematic diagrams of examples of scan-out portions of scan-out display devices in accordance with examples described herein.

FIG. 3 illustrates an example of a rolling scan-out display device 300 including multiple scan-out portions that are part of a scan-out width 302, 304, 306. For example, the device 300 can be represented substantially as a rectangle that corresponds to a collection of pixels on the display. The rectangle is shown as logically divided into a number of segments that have the same or different scan-out width. Each scan-out width 302, 304, 306 includes multiple scan-out portions in the scan-out width that are activated in sequence from left to right. In addition, each scan-out width 302, 304, 306 is activated in sequence after the scan-out portions of a given scan-out width are activated. Thus, scan-out display device 300 activates scan-out portion 1, then 2, . . . , to n, and then activates scan-out portion n+1, n+2, . . . to m, then activates scan-out portion m+1, m+2, . . . to p, etc., and can loop back to 1 after the last scan-out portion of the last scan-out width is activated. In this regard, each scan-out portion may have an associated latency for activation, which may be a latency based on when the first scan-out portion is displayed. Scan-out display device 300 can have associated scan-out regions of substantially any granularity. For example, the scan-out portions may be the scan-out widths of the rolling scan-out display device 300 (e.g., scan-out portions 302, 304, 306 that each span the width of the display device 300) and/or may include substantially any number of portion per width, any number of widths per portion, etc.

FIG. 3 also illustrates an example of another scan-out display device 310 having multiple scan-out portions that are not in a rolling scan-out order. For example, in scan-out display device 310 portion 1 312 is in a center or otherwise surrounded by other portions of the scan-out display device, while other scan-out portions are divided and positioned around portion 1 312. In this example, scan-out display device 310 can activate the portions as numbered. Scan-out display devices, as contemplated herein, may have substantially any configuration of scan-out portions and indeed, in some example, some portions may be activated in parallel at different parts of the display panel 132. In any case, the scan-out portions of the scan-out display device can be determinable along with at least relative latencies associated with displaying each scan-out portion. Thus, display interface 116 can determine when certain portions of the image will be displayed on the display device 102 in the scan-out. At action 204, for example, the first portion of the image can be displayed by activating at least one of the scan-out portions of the scan-out display device 300, 310, and the second portion, as described further below, can be displayed at a subsequent (e.g., a larger indexed) scan-out portion of the scan-out display device 300, 310. In one example, compensating component 144, as described herein, may receive the scan-out properties 146 from the display device 102 and/or an associated interface, driver, etc. Due to latencies associated with such scan-out displays, displayed images may appear (e.g., seen by a user as being) distorted based on motion occurring during displaying of different portions of the image. This motion can be predicted and compensated, as described herein.

In method 200, at action 204, a motion can be predicted during a latency between a first time associated with activating a first portion of the scan-out display device and a second time associated with activating a second portion of the scan-out display device. In an example, motion determining component 142, e.g., in conjunction with processor 104, memory 106, etc., can predict the motion during the latency between the first time associated with activating the first portion of the scan-out display device (e.g., display device 102) and the second time associated with activating the second portion of the scan-out display device. For example, motion determining component 142 can predict a change in head position (e.g., position of the VR device), which may be similar to the prediction performed in rendering the image at action 202. For example, motion determining component 142 can predict the motion based on a determined and/or predicted velocity of movement of the head (or VR device), acceleration of the head (or VR device), etc. In an example, motion determining component 142 can predict the motion for and/or near one or more latencies associated with different scan-out portions of the scan-out display device (e.g., display device 102). In the examples described herein, motion determining component 142 can predict motion over a period of time, and/or for multiple time instances, corresponding to the display time associated with the image at 204 before displaying one or more portions of the image (and/or before displaying any portion of the image).

In another example, motion determining component 142 can predict motion after displaying the first portion of the image to determine another portion of the image for displaying based on the predicted motion (e.g., based on a different head position predicted after displaying the first portion of the image) in an attempt to update the scan-out portion so the scan-out display device displays the image at the desired orientation. In this example, the various components 142, 144 can be part of hardware (e.g., GPU 114) to facilitate prediction and compensation of the second portion of the image after scanning out the first portion of the image or otherwise performing prediction and compensation during the scan-out process.

In one example, predicting the motion at action 204 may optionally include, at action 206, determining the direction of the motion. In an example, motion determining component 142, e.g., in conjunction with processor 104, memory 106, etc., can determine the direction of the motion, which may be based at least in part on determining a motion vector that can indicate the direction of the motion based on a current or previous head position (e.g., a relative motion that is relative to the current or previous head position). Moreover, for example, the motion can be determined or predicted in a real world coordinate space (e.g., based on input from the VR device, such as from an accelerometer, gyroscope, or other movement or position measuring device on the VR device), which can be transformed to a virtual coordinate space of the application 110 for determining portions of an image to display based on the motion. In addition, predicting the motion over a period of time and based on a sampling interval, which may thus include predicting a number of motion samples during the latency. In this example, predicting the motion during the latency may include matching one or more of the motion samples with the latency. This may result in applying distortion for various portions of the image based on one or more of the motion samples that may correspond to predicted motion at the time the given portion of the image is to be displayed by the scan-out display device (e.g., display device 102).

In method 200, at action 208, at least a second portion of an image, to be displayed at the second time, can be distorted based at least in part on a function of the motion and the latency to compensate for the latency. In an example, compensating component 144, e.g., in conjunction with processor 104, memory 106, etc., can distort at least the second portion of the image, to be displayed at the second time, based at least in part on the function of the motion and the latency to compensate for the latency. For example, compensating component 144 can distort the second portion of the image (and/or additional portions of the image) based on scan-out properties 146 of the scan-out display. In an example, the scan-out properties 146 can include not only latency associated with the scan-out portions of the scan-out display device (e.g., display device 102), but also an order by which the scan-out portions are activated, a size of the scan-out portions (e.g., as a number of pixels or other measurement), a scan-out width associated with one or more of the scan-out portions, etc. The scan-out properties 146 can allow for determining or at least estimating when the display device 102 is going to display which scan-out portion, such to allow for distorting the portion of the image (and/or additional portions of the image) corresponding to the latencies associated with the scan-out display, and the predicted motion at or near a time associated with the latencies.

In one example, distorting at least the second portion of the image at action 208 can optionally include, at action 210, distorting at least the second portion of the image by skewing in a second direction that opposes the direction of the motion. In an example, compensating component 144, e.g., in conjunction with processor 104, memory 106, etc., can distort at least the second portion of the image by skewing in a second direction that opposes the direction of the motion. For example, the compensating component 144 can distort the image based on transforming the motion vector determined by motion determining component 142 such to oppose the predicted or determined motion on the virtual coordinate space associated with the image. This can counteract a perceived distortion of the image caused by the motion. For example, distorting the second portion of the image may include generating one or more transformation matrices to transform one or more portions of the image, where the one or more transformation matrices may be generated to apply a transformation to a portion of the image corresponding to a portion of the display device and an associated latency. In other examples, portions of the image may be arbitrarily transformed (e.g., without using a transformation matrix that may have been used over other portions of the image). An example is shown in FIG. 4.

Figure 4:
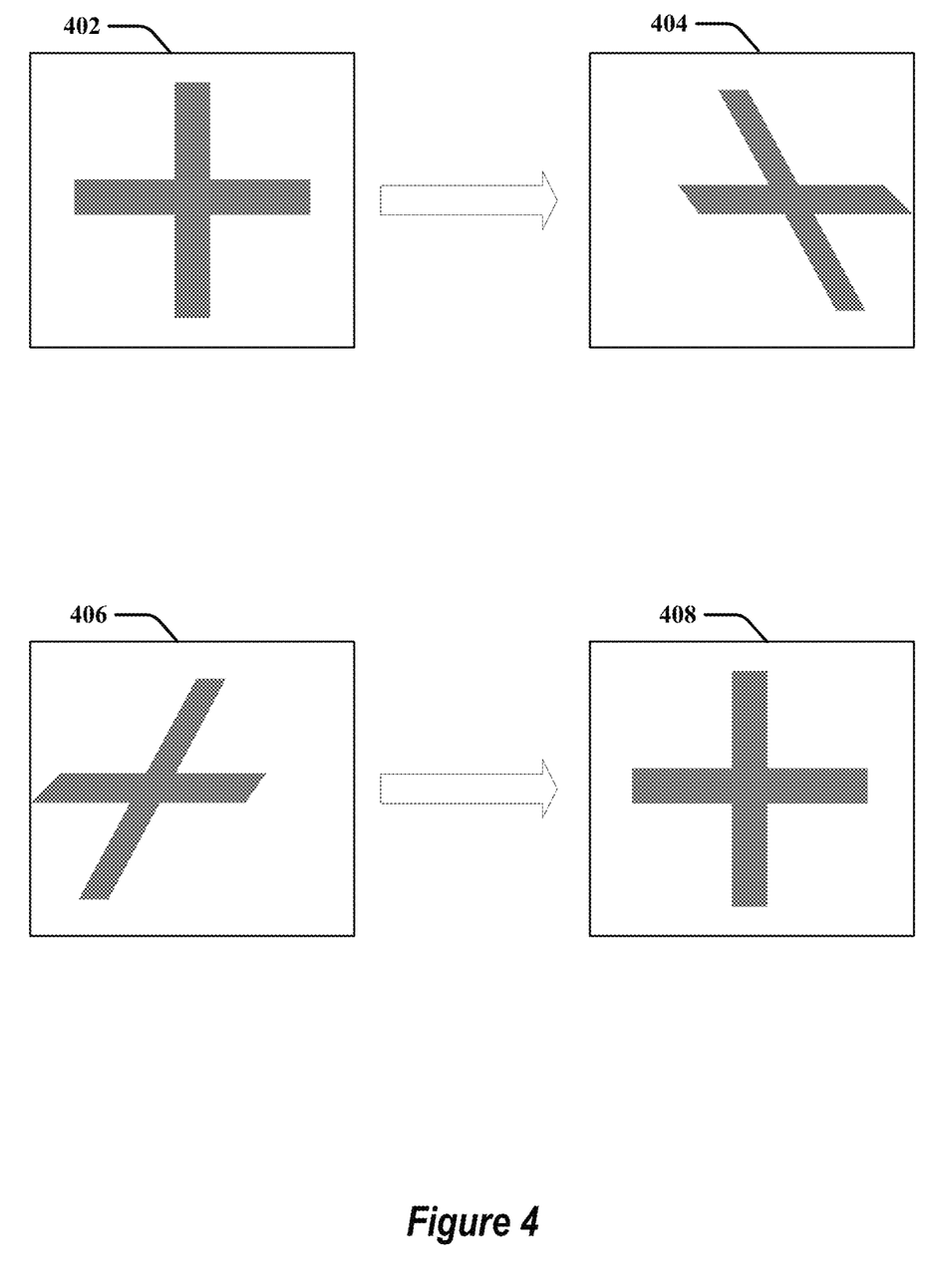
FIG. 4 illustrates schematic diagrams of examples of displays in accordance with examples described herein.

FIG. 4 illustrates examples of displays 402, 404, 406, 408 of an image. Display 402 can represent an image displayed on a scan-out display device, such as a rolling scan-out display device 300, as perceived with no associated motion. If there is a left to right motion as the image is being displayed (e.g., a predicted or actual motion, as described above), display 404 can represent the perceived image on the rolling scan-out display device 300 as the display scans out from left to right and top to bottom. In this display 404, as the pixels are scanned out, they are perceived to move with the motion from left to right when viewed by a user on a conventional display.

To counteract this perception, compensating component 144 can distort the image, based on motion determining component 142 detecting or predicting the left to right motion (e.g., of the head position), such to display pixels increasingly to the left during the motion, as shown in display 406. Displaying display 406 on the rolling scan-out display, based on the associated predicted or determined left to right motion, can result in a perceived image in display 408 as viewed by a user on a display device when the motion occurs as predicted. In this example, compensating component 144 can distort the image in the direction opposing the direction of motion detected or predicted by motion determining component 142. Thus, instead of displaying display 402 and perceiving display 404, compensating component 144 can distort the image so display 406 is displayed and perceived as display 408, which is the intended image to be perceived.

Though shown in the context of the rolling scan-out, compensating component 144 can distort scan-out portions in any type of scan-out display so long as the scan-out properties 146 include the scan-out order of the scan-out portions (e.g., as explicitly indicated or otherwise known of the display type) and associated latencies for determining the predicted head position at the associated times (e.g., as explicitly indicated or otherwise known of the display type). In this example, compensating component 144 can predict the head position at each time (e.g., based on the associated latency for the scan-out portions), and can distort the portion of the image corresponding to the scan-out portion by transforming the motion or change in head position from the real world coordinate space to the virtual coordinate space of the image, and applying distortion to the image in this regard to move the pixels in a direction opposing the motion before displaying the scan-out portion.

In an example, distorting at least the second portion of the image at action 210 can include distorting the entire image, distorting the second portion of the image that is to be displayed in the second scan-out portion of the display device, distorting any remaining portions of the image that have not yet been displayed, and/or the like. Remaining portions, in an example, can be additionally distorted based on subsequent times/latencies at which they are to be displayed on a corresponding portion of the scan-out display device.

In method 200, at action 212, a first portion of the image can be displayed at the first time by activating the first portion of the scan-out display device. In an example, display interface 116, e.g., in conjunction with processor 104, memory 106, display port 118, display port 136, display device 102, etc., can display the first portion of the image at the first time by activating the first portion of the scan-out display device (e.g., display device 102). For example, rendering component 140 can provide the first portion of the image to the display interface 116 for displaying the first portion of the image via the display device 102. In this example, the display device 102 can activate the first portion of the display panel 132 to display the first portion of the image, which may include activating corresponding portions (e.g., portions or pixels that emit light or generate photons) in a region of the display panel 132. In an example, the first portion of the image may be rendered based on a predicted head position and/or may be distorted based on predicting motion between a latency between a time at which a previous portion of the image is displayed and the first time.

In method 200, at action 214, the second portion of the image can be displayed at the second time by activating the second portion of the scan-out display device. In an example, display interface 116, e.g., in conjunction with processor 104, memory 106, display port 118, display port 136, display device 102, etc., can display the second portion of the image by activating the second portion of the scan-out display device (e.g., display device 102). For example, compensating component 144 can provide the distorted second portion of the image to the display interface 116 for displaying the second portion of the image via the display device 102. In one example, compensating component 144 can provide the distorted second portion of the image to the display interface 116 along with the entire image, various portions of which can have been distorted as described based on motion predicted at multiple time instances related to latencies in displaying multiple portions of the image on the scan-out display. In this example, the display device 102 can activate the second portion of the display panel 132 to display the second portion of the image, which may include activating corresponding pixels or other portions in a region of the display panel 132.

Figure 5:
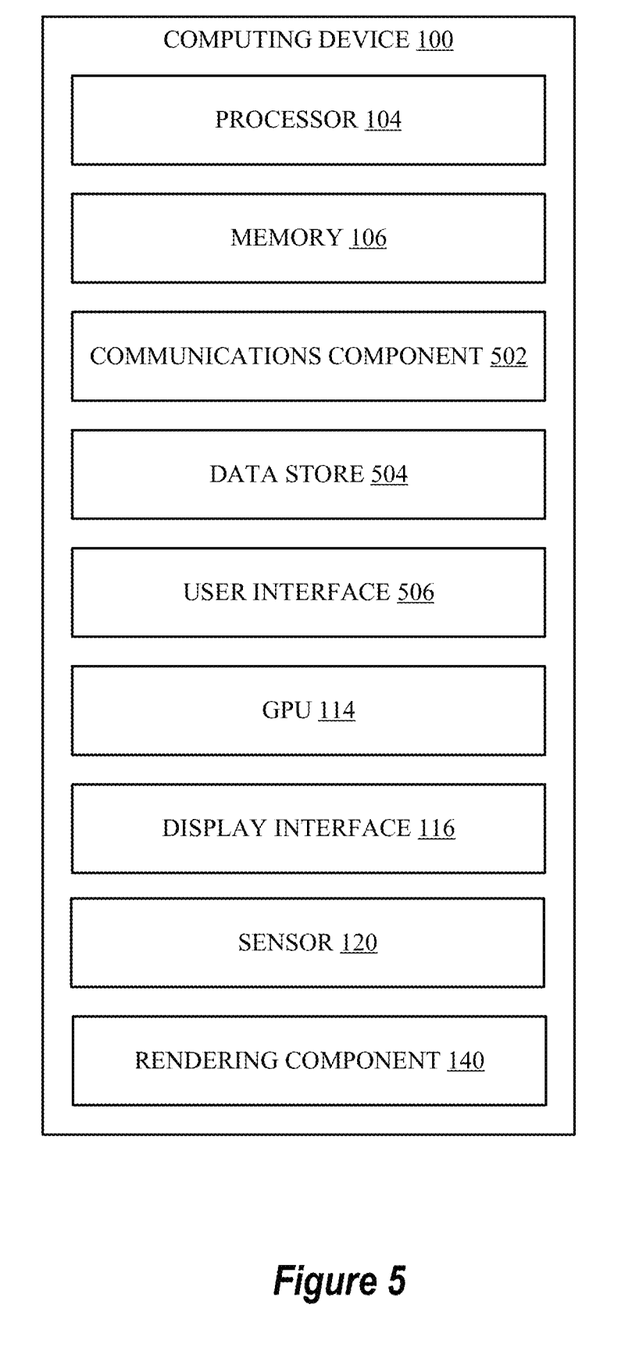
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, display driver, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof.

Computing device 100 can also include a GPU 114, as described herein, for rendering frames based on rendering instruction received from processor 104. GPU 114 can additional send signals via a display interface 116 to cause display of the rendered frames on a display device. Computing device 100 may also include one or more sensors 120, as described, for determining one or more parameters related to setting a scene orientation, such as head position in a VR device. Additionally, computing device 100 may include a rendering component 140, as described herein, to render an image and/or distort portions of an image for display according to associated latencies of a scan-out display device.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for displaying an image on a display device, comprising:

predicting at least a direction of a motion during a latency between a first time associated with activating a first portion of the display device to emit light for displaying a first portion of the image and a second time associated with activating a second portion of the display device to emit light for displaying a second portion of the image;

distorting at least the second portion of the image, from the first portion of the image, to be displayed at the second time, based at least in part on a function of the motion and the latency to compensate for the latency by skewing at least the second portion of the image from the first portion of the image in a second direction that opposes the direction of the motion, wherein skewing at least the second portion of the image is based on transforming the motion from a real world coordinate space to a virtual coordinate space of the image and moving pixels of at least the second portion of the image in a direction opposing the motion;

displaying the first portion of the image at the first time by activating the first portion of the display device; and displaying the second portion of the image, as distorted, at the second time by activating the second portion of the display device.

2. The method of claim 1, wherein the distorting is further based at least in part on one or more properties of a scan-out order of the display device, and wherein activating the first portion of the display device to emit light for displaying the first portion of the image and activating the second portion of the display device to emit light for displaying the second portion of the image is based on the scan-out order of the display device.

3. The method of claim 2, wherein the one or more properties of the scan-out order comprise at least one of an indication of scan-out portions on the display device and associated order of display of the scan-out portions, latencies associated with the scan-out portions, or a number of pixels displayed in the scan-out portions.

4. The method of claim 1, wherein the motion corresponds to movement in a determined head position of a virtual reality (VR) device comprising the display device.

5. The method of claim 4, wherein predicting the motion is based at least in part on a velocity or acceleration of the determined head position.

6. The method of claim 1, further comprising distorting the first portion of the image based at least in part on another motion predicted during another latency between the first time and a previous time associated with activating a previous portion of the display device.

7. A computing device for displaying an image on a display device, comprising:

a memory storing one or more parameters or instructions for executing an operating system and one or more applications;

a display interface coupled with the display device for communicating signals to display images on the display device; and at least one processor coupled to the memory and the display interface, wherein the at least one processor is configured to:
- predict at least a direction of a motion during a latency between a first time associated with activating a first portion of the display device to emit light for displaying a first portion of the image and a second time associated with activating a second portion of the display device to emit light for displaying a second portion of the image;
- distort at least the second portion of the image, from the first portion of the image, to be displayed at the second time, based at least in part on a function of the motion and the latency to compensate for the latency by skewing at least the second portion of the image from the first portion of the image in a second direction that opposes the direction of the motion, wherein skewing at least the second portion of the image is based on transforming the motion from a real world coordinate space to a virtual coordinate space of the image and moving pixels of at least the second portion of the image in a direction opposing the motion;
- display the first portion of the image at the first time by activating the first portion of the display device; and
- display the second portion of the image, as distorted, at the second time by activating the second portion of the display device.

8. The computing device of claim 7, wherein the at least one processor is configured to distort at least the second portion of the image further based at least in part on one or more properties of a scan-out order of the display device, and wherein activating the first portion of the display device to emit light for displaying the first portion of the image and activating the second portion of the display device to emit light for displaying the second portion of the image is based on the scan-out order of the display device.

9. The computing device of claim 8, wherein the one or more properties of the scan-out order comprise at least one of an indication of scan-out portions on the display device and associated order of display of the scan-out portions, latencies associated with the scan-out portions, or a number of pixels displayed in the scan-out portions.

10. The computing device of claim 7, wherein the motion corresponds to movement in a determined head position of a virtual reality (VR) device comprising the display device.

11. The computing device of claim 10, further comprising one or more sensors configured to determine a velocity or acceleration of the determined head position, wherein the at least one processor is configured to predict the motion based at least in part on the velocity or acceleration of the determined head position.

12. The computing device of claim 7, wherein the at least one processor is further configured to distort the first portion of the image based at least in part on another motion predicted during another latency between the first time and a previous time associated with activating a previous portion of the display device.

13. A non-transitory computer-readable medium, comprising code executable by one or more processors for displaying an image on a display device, the code comprising code for:
- predicting at least a direction of a motion during a latency between a first time associated with activating a first portion of the display device to emit light for displaying a first portion of the image and a second time associated with activating a second portion of the display device to emit light for displaying a second portion of the image;
- distorting at least the second portion of the image, from the first portion of the image, to be displayed at the second time, based at least in part on a function of the motion and the latency to compensate for the latency by skewing at least the second portion of the image from the first portion of the image in a second direction that opposes the direction of the motion, wherein skewing at least the second portion of the image is based on transforming the motion from a real world coordinate space to a virtual coordinate space of the image and moving pixels of at least the second portion of the image in a direction opposing the motion;
- displaying the first portion of the image at the first time by activating the first portion of the display device; and
- displaying the second portion of the image, as distorted, at the second time by activating the second portion of the display device.

14. The non-transitory computer-readable medium of claim 13, wherein the code for distorting is further based at least in part on one or more properties of a scan-out order of the display device, and wherein activating the first portion of the display device to emit light for displaying the first portion of the image and activating the second portion of the display device to emit light for displaying the second portion of the image is based on the scan-out order of the display device.

15. The non-transitory computer-readable medium of claim 14, wherein the one or more properties of the scan-out order comprise at least one of an indication of scan-out portions on the display device and associated order of display of the scan-out portions, latencies associated with the scan-out portions, or a number of pixels displayed in the scan-out portions.

16. The non-transitory computer-readable medium of claim 13, wherein the motion corresponds to movement in a determined head position of a virtual reality (VR) device comprising the display device.

17. The non-transitory computer-readable medium of claim 16, wherein the code for predicting the motion is based at least in part on a velocity or acceleration of the determined head position.

* * * * *